United States Patent [19]
Schwetz et al.

[11] Patent Number: 5,762,895
[45] Date of Patent: Jun. 9, 1998

[54] BEARING MATERIAL OF POROUS SIC HAVING A TRIMODAL PORE COMPOSITION

[75] Inventors: Karl Alexander Schwetz, Sulzberg; Anton Katheininger, Erolzhein; Michael Fundus, Kempten; Jochen Greim, Buchenberg, all of Germany

[73] Assignee: Elektroschmelzwerk Kempton, GmbH, Munich, Germany

[21] Appl. No.: 772,112

[22] Filed: Dec. 20, 1996

Related U.S. Application Data

[63] Continuation of Ser. No. 437,026, May 8, 1995, abandoned.

[30] Foreign Application Priority Data

Jun. 1, 1994 [DE] Germany ............ 44 19 243.6

[51] Int. Cl.$^6$ .................................. C01B 31/36
[52] U.S. Cl. .................. 423/345; 501/88; 428/446; 277/96
[58] Field of Search .............. 423/345, 275, 423/265; 264/42, 43, 44; 501/81, 82, 83, 88; 428/402, 446; 277/96

[56] References Cited

U.S. PATENT DOCUMENTS

| | | | |
|---|---|---|---|
| 5,080,378 | 1/1992 | Kagawa | 277/96 |
| 5,427,761 | 6/1995 | Grindatto et al. | 423/345 |

FOREIGN PATENT DOCUMENTS

| | | |
|---|---|---|
| 0486336 | 5/1992 | European Pat. Off. |
| 0578408 | 1/1994 | European Pat. Off. |
| 3927300 | 9/1993 | Germany |
| 9325495 | 12/1993 | WIPO |

OTHER PUBLICATIONS

Chemical Abstracts, vol. 113, No. 22, Nov. 26, 1990, Columbus, Ohio, US Abstract No. 19649h & JP 02055273 (Showa Denko, K.K.).

Chemical Abstracts, vol. 114, No. 4, Jan. 28, 1991, Columbus, Ohio, US; Abstract No. 29012p & JP-A-02121759 (Harima Ceramic Co. Ltd.) May 9, 1990.

Lubrication Engineering, vol. 50, No. 1, Jan. 1994, pp. 75–80. R. Divakar "Sintered Silicon Carbides with Controlled Porosity for Mechanical Face Seal Applications".

Database Abstract of EP 486 336; AN 92–168907 (21) 1994 (no month).

*Primary Examiner*—Steven Bos
*Assistant Examiner*—Stuart L. Hendrickson
*Attorney, Agent, or Firm*—Burgess, Ryan & Wayne

[57] ABSTRACT

The invention relates to bearing materials of porous SiC having a trimodal pore composition and also a process for their production.

The porous bearing material of pressureless-sintered SiC having from 3 to 10% by volume of independent closed pores having a trimodal pore composition consisting of micropores (M), fiber-shaped macropores (F) and spherical macropores (S), where the amounts in the pore system F-M-S (FIG. 1) are fixed by the trapezoidal area having the corner points $a = 10\%M - 80\%F - 10\%S$ $b = 10\%M - 10\%F - 80\%S$ $c = 40\%M - 10\%F - 50\%S$ $d = 40\%M - 50\%F - 10\%S$ and the micropores have a diameter of less than or equal to 5 µm and the fiber-shaped macropores have a diameter of less than or equal to 30 µm and a length of less than or equal to 80 µm and the spherical macropores have a diameter of less than or equal to 70 µm, and have a flexural strength of at least 250 MN/m$^2$.

9 Claims, 3 Drawing Sheets

BEARING MATERIAL OF POROUS SIC HAVING A TRIMODAL PORE COMPOSITION

This application is a continuation of application Ser. No. 08/437,026, filed May 8, 1995 now abandoned.

BACKGROUND OF THE INVENTION

1) Field of the Invention

The invention relates to bearing materials of porous SiC having a trimodal pore composition and also a process for their production.

2) Background Art

Dense sintered SiC has high hardness, high-temperature strength, high thermal conductivity, thermal shock resistance, oxidation resistance, and also high abrasion and corrosion resistance. It also has a very good tribological behavior which means the frictional and wear behavior with and without lubrication. For this reason, sintered pure SiC has been introduced as an almost ideal material for sliding bearings and, in particular, seal rings subject to wear stresses and in these applications has displaced other materials such as, for example, aluminum oxide or cemented carbide. Particularly in water pumps in the automobile industry, the use of mass produced seal rings of sintered SiC is achieving an ever greater market share. Dense sintered SiC has a purity of $\geq 98.5\%$ SiC and has a sintered density of typically 3.10–3.16 g/cm$^3$, corresponding to a residual porosity of 1–3% by volume. Thanks to its high hardness (Knoop HK–0.1=2500) and strength (flexural strength: about 400 MN/m$^2$), the sintered SiC is extraordinarily resistant to wear by solid particles which are carried along in liquid media. Even under a combination of abrasive and corrosive wear, this ceramic material is wear resistant.

Many sliding wear problems nevertheless occurring in practice can be attributed to interruption of the ideal, i.e., properly lubricated, running conditions, where the sliding surfaces of the bearings or seals in question come into contact with one another, whereby a solid body friction or dry friction arises which is apparent in a strong increase in the coefficient of friction. Local frictional heat leads to thermal stress peaks which can be so intense that they cause break-out of constituents of the microstructure. When lubrication is resumed (cooling), there is the danger of crack formation and fracture as a result of thermal shock. Although dense, sintered SiC generally copes with such situations better than other ceramics, there is a need for further-developed SiC bearing materials for use in seal rings and sliding bearings which run under more difficult hydrodynamic conditions and whose reliability is to be increased.

Such attempts to optimize the sintered SiC with regard to its tribological properties have already become known. They are based on the concept of introducing and homogenously distributing an additional small amount of porosity in the form of closed pores having average pore sizes >10 μm in the otherwise dense SiC sintered microstructure so as to achieve a lubricant pocket function in the functional surface (sliding surface). These macropores result in depressions in areas in the functional surface in which depressions additional lubricating liquid can collect and form a reservoir. This liquid reservoir stored in the pores can ensure residual lubrication in critical situations, e.g. in the case of brief failure of the lubricant supply so that prolonged dry running and spontaneous failure of the bearing elements associated therewith is prevented. Here, the macropores introduced into the SiC microstructure have to be present as individual pores since only then can a hydraulic pressure build up in the pore. Continuous channel pores (open porosity) are definitely to be avoided in the bearing material because of leakage requirements. However, since the additionally introduced porosity can lower the strength of the ceramic component, limits are placed on the level of the porosity (% by volume) and, in particular, on the pore size.

In DE-PS-39 27 300 of the Company Showa Denko K.K./Tokyo, for example, porous SiC sintered bodies having a total porosity of 4–14% by volume are proposed for seal rings. The pores in these pressureless-sintered SiC bodies are independent of one another and closed and have a smoothly rounded surface and also a mean pore size of 10–40 μm. They are produced either by means of sintering techniques (starting with a mixture of fine and coarse SiC powders or by incomplete sintering) or preferably by incorporation of plastic spheres in the SiC compact and subsequently pyrolysis of the spheres. In the latter case, a particular total porosity and mean pore size can be set in a targeted manner via the amount and size of the plastic spheres. As indicated in the description, the mean pore size of 10–40 μm in the resulting SiC sintered body is, in particular, of decisive importance for tribological applications as a seal ring: porous SiC sintered bodies having a mean pore size of <10 μm are disadvantageous as bearing elements because the lubricant pocket effect is too low in the case of small pores. Likewise, porous SiC sintered bodies having a mean pore size >40 μm should also be unsuitable for sliding rings because of, inter alia, early leakage (permeability) of the floating-ring seal and increased ring wear. The reason given for the increased wear observed is the insufficient strength of such coarse-pored SiC sintered bodies having a porosity of 8%, the change from a mean pore size of 10 μm to one of 50 μm resulted in strength reduction from 40 kp/mm$^2$ to 20 kp/mm$^2$, i.e. to half the value. A strength reduced to this extent can only be explained by the occurrence of large local defects (individual giant pores) or cracks. It can be concluded therefrom that in this German Patent the good tribological properties of sufficiently strong, porous SiC wintered bodies having mean pore sizes of $\geq 40$ μm were not able to be recognized because of defective production.

The European Patent Application EP-A-486336 of the Company Ceramiques et Composites discloses coarse-pored SiC bearing elements having a total porosity of 4–18% by volume and mean pore sizes in the range of 40–200 μm, which elements have been produced by means of pressureless sintering from sinterable SiC powders likewise with a pore-forming addition in the form of plastic spheres. However, as can be seen from the disclosure and in particular from the examples, mean pore sizes of 60–100 μm and total porosities of 8–15% by volume are preferred for the tribological use of this "coarse-pored silicon carbide". No indication is given of the strength of these coarse-pored SiC sintered bodies. Although the SiC bearing materials described in this EP application can meet the sealing and wear requirements for the low pressure range, i.e., for small pressure differences to be sealed such as, for example, 1 bar (see Example 1 of EP-A-486336), they do not meet the requirements in the pressure range $\geq 10$ bar. Since at mean pore sizes in the preferred range of 60–100 μm and the simultaneously high total porosity in the range of 8–15% by volume the SiC component strength is considerably reduced, tight limits are also placed on the use of this coarse-pored SiC as sliding ring and counter ring in hard/hard couples.

WO 93/25495 of the Carborundum Company, USA discloses fine-pored SiC sintered bodies having a porosity of from 3 to 15% by volume, with the pores being non-uniformly shaped and having a maximum size of from about 3 to 5 μm and a ratio of length to width (aspect ratio) of from 1:1 to 3:1. These sintered bodies are produced using SiC having a bimodal particle size distribution, i.e., mixtures of two SiC powders having a differing mean particle size. For example, a fine sinter-active SiC powder having a mean particle size of 0.5 μm is mixed with a less sinter-active coarse SIC powder having a mean particle size of 3 μm. Although these sintered bodies can be produced at low cost as a result of the use of cheap, coarse SiC powder, their tribological suitability in critical situations could be improved, which can be explained by the poor lubricant pocket function of micropores smaller than or equal to 5 μm.

EP-A-578408 of the Carborundum Company, USA discloses coarse-pored SiC sintered bodies having a porosity of from 2 to 12% by volume, in which the pores are spherical in shape and have a diameter of from 50 to 500 μm. These coarse-pored SiC sintered bodies have essentially already been described by EP-A-486336 of Ceramiques et Composites.

SUMMARY OF THE INVENTION

It is an object of the invention to improve further the SiC bearing material known per se with regard to its tribological and mechanical properties, so that it can be used for a wide range of applications which means, for example, that it can be used both at low pressure and at high pressure in combination with graphite and also by itself.

This object is achieved according to the invention by a porous bearing material of pressureless-sintered SiC having from 3 to 10% by volume or independent closed pores where the material has a tripodal pore composition consisting of micropores (M), fiber-shaped macropores (F) and spherical macropores (S), whose amounts in the pore system F-M-S (FIG. 1) are fixed by the trapezoidal area having the corner points:

$$a=10\%M-80\%F-10\%S$$

$$b=10\%M-10\%F-80\%S$$

$$c=40\%M-10\%F-50\%S$$

$$d=40\%M-50\%F-10\%S$$

and the micropores have a diameter of less than or equal to 5 μm and the fiber-shaped macropores have a diameter of less than or equal to 30 μm and a length of less than or equal to 80 μm and the spherical macropores have a diameter of less than or equal to 70 μm, and the flexural strength is at least 250 MN/m².

The micropores have a pore size distribution of from 0.1 μm to 5 μm.

The aspect ratio of the fiber-shaped macropores is preferably from 2:1 to 50:1 and, in general, from 2:1 to 20:1. The size distribution of the fiber-shaped macropores is preferably in the ranges $d_F$=5 to 25 μm and $l_F$=10 to 80 μm ($d_F$: fiber diameter, $l_F$: fiber length). Fiber pore diameters of from 8 to 20 μm and fiber pore lengths of from 20 to 70 μm have been found to be particularly useful.

The spherical macropores preferably have a size distribution of from 30 to 70 μm, particularly, preferably, a size distribution of from 40 to 60 μm.

The dense SiC matrix present in addition to the pores comprises α-silicon carbide containing up to 2% by weight (total) or elemental carbon, aluminum and/or boron, with the α-SiC preferably being present in the form of prismatic, tabular crystallites having a mean particle size <50 μm.

The schematic cross section of the material is shown in FIG. 2.

DESCRIPTION OF THE PREFERRED EMBODIMENTS

Figure 1:
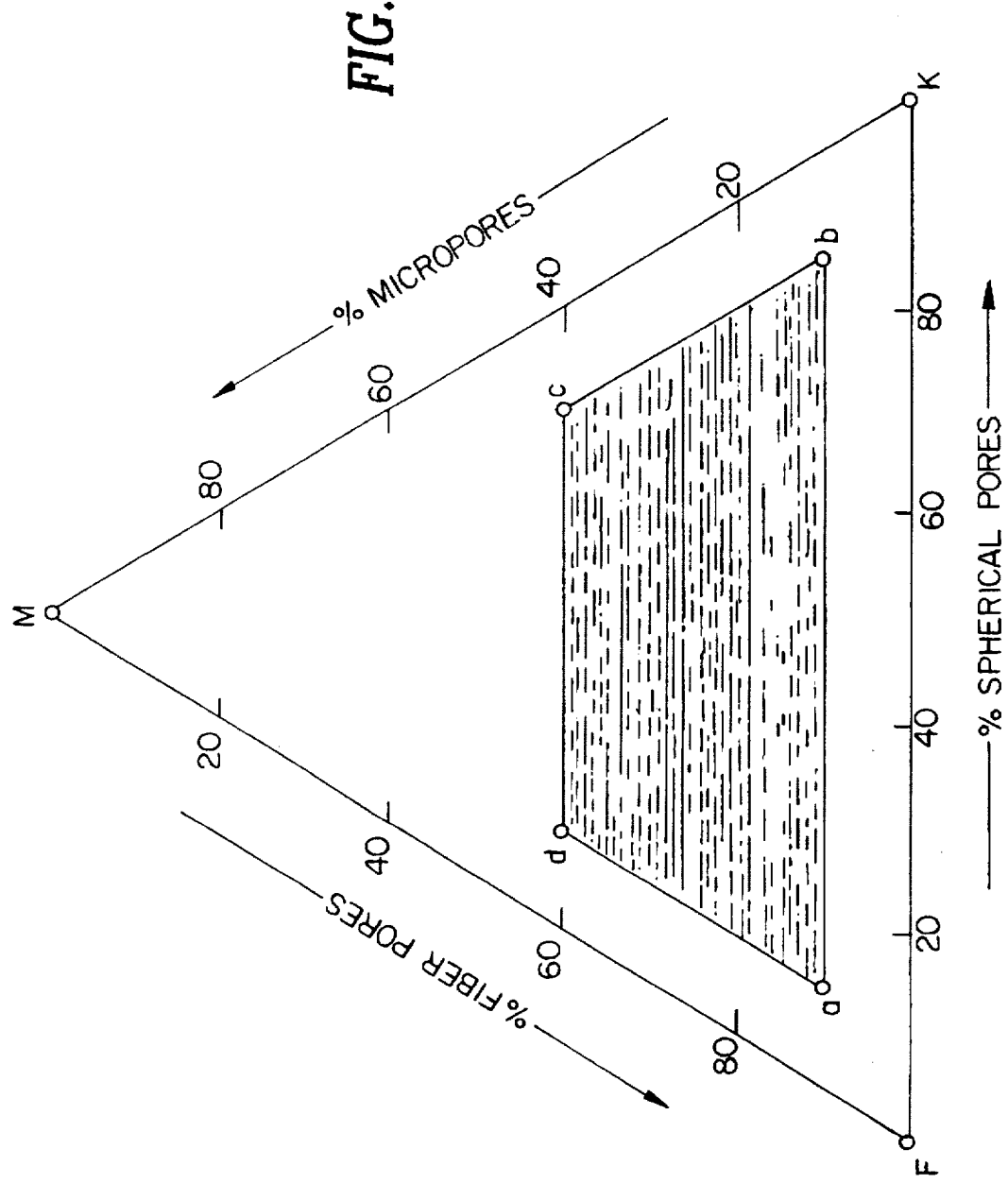
FIG. 1 is a ternary system depicting the volume percent composition of micropores (M), fiber pores (F) and spherical macropores (S)

To produce the SiC bearing material of the invention, the SiC starting powder used is advantageously commercial α-SiC having a particle size distribution <5 μm, preferably <3 μm, and a specific surface area of 10–15 m²/g (measured by the BET method), and a purity of at least 99.5%, based on the metallic impurities.

As macropore-producing additives, use is made of organic short fibers and plastic spheres which, owing to their low decomposition temperature (<800° C.), produce hollow spaces in the form of fiber pores and spherical pores during the further processing of the SiC compound prior to the actual sintering process.

Fiber materials which can be used are comminuted and size-classified synthetic or plant fibers such as, for example, cotton, flax, woodpulp or cellulose fibers, polyamide, polyester and polyacrylonitrile fibers, with pure cellulose fibers having been found to be particularly useful.

Suitable sphere materials are thermoplastic and thermoset plastics such as, for example, polymethacrylates, polyethylene, polystyrene, polyamides and bakelite. Preference is given to using polymethacrylate spheres, in particular poly(methyl methacrylate) spheres (PMMA), in a narrow size distribution.

The total amount of the additives forming fiber pores and spherical pores, their relative proportions and their size distribution are of decisive importance for the production and properties of the SiC bearing materials of the invention.

The additives forming fiber pores preferably have a length of from 15 to 90 μm and a diameter of from 8 to 30 μm. Particularly preferred are lengths of from 30 to 80 μm, and diameters of from 10 to 25 μm.

The additives forming spherical pores preferably have a sphere diameter of from 40 to 80 μm. A diameter range of from 50 to 70 μm is particularly preferred.

Spheres having a diameter of >80 μm should be avoided since, in the shaping process, they can lead to green bodies containing cracks.

The size distribution of the additives forming macropores is of great importance for achieving the properties, in particular the strength properties, of the bearing elements of the invention. Experiments have shown that with relatively broad size distributions of the macropores, a flexural strength of the bearing materials of >250 MN/m², which is required for critical specific component stressing, can no longer be achieved. This can be attributed to the presence of a few macropores having diameters of >100 μm and acting as critical flaws and/or cracks linking the pores.

The relative proportions of the additives forming the fiber pores and spherical pores are selected in such a way that the weight ratios of short fibers: spheres are between 9:1 and 1:9. The best results are achieved in the range of short fibers: spheres of from 4:1 to 1:4.

To produce the material of the invention, the SiC starting powder is processed in a manner known per se together with up to 7% by weight of customary sintering additives and pressing aids to give a slip and is subsequently processed in a suitable manner, for example, by spray drying of the pre-prepared slip, to give a free-flowing granular material.

Suitable sintering additives are, for example, elemental carbon, elemental aluminum, elemental boron, aluminum nitride and boron carbide, with elemental carbon in the form of particulate graphite or carbon black and finely divided aluminum nitride powder having been found to be particularly useful.

Suitable pressing aids are, for example, polyvinyl alcohol, polyvinyl acetate, aluminum stearate, polyacrylate, polyether and sugar. Advantageously, polyvinyl alcohol obtainable under the name Poiyviol from Wacker-Chemie GmbH, Munich is used together with sugar (saccharose) as a pressing aid.

To the dry SiC granular material are added, with mixing, the organic additives giving macropores in the form of organic short fibers and spheres of narrow size distribution in an amount of preferably 1–3.5 parts by weight based on the SiC powder doped with the sintering aids. It is mixed until a homogeneous, ready-to-press mixture has been formed. This can be done, for example, in a dry mixer.

However, it is also possible, as is advantageous in mass production for cost reasons, to produce the ready-to-press mixture directly by spray drying without this separate dry mixing process step, by mixing the pore-forming additives in the specified amounts into the slip for spraying.

The ready-to-press mixture Is subsequently pressed and shaped, for example by axial die pressing or isostatic pressing, to give green bodies. It has here been surprisingly found that the ready-to-press SiC mixtures of the invention which contain fibers offer pressing advantages in comparison with those mixtures not containing fibers (e.g. mixtures containing exclusively spheres as macropore-forming additive or mixtures without macropore-forming additive). In die pressing, the fiber content reduces the springback and crack formation of the pressed bodies, giving "fiber-reinforced green bodies" having a fracture strength which is from about 20 to 60% greater than the fracture strength without fibers.

Owing to the reduced springback, induced stresses in the solid body which can lead to cracks can be reduced. A high strength of the pressed bodies is of great importance in order to avoid rejection during further processing, e.g., by green machining, and also for the storage and transport of the green parts, etc.

The pressed shaped bodies are subsequently subjected to heat treatment for from 10 to 24 hours at temperatures in the range between 100° and 1000° C. in the presence of an inert atmosphere, to remove the pressing aids and to pyrolyze the additives forming pores. Subsequently, the preheated shaped bodies are pressureless-sintered at a temperature of 2000°–2100° C. in the presence of a protective gas atmosphere or in a vacuum for from 20 to 60 minutes until the SiC bearing element of the invention is formed.

During sintering, the shaped bodies and the macropores undergo a shrinkage of 17–19%, based on the diameter of the pressed body or the macropores present therein, and there are formed the micropores having a size distribution <5 µm, whose proportion by volume can be set in a manner known per se via the pressed density and the sintering parameters (final temperature/hold time).

The SiC sintered bodies produced by the process of the invention have a total porosity of 3–10% by volume and a flexural strength of above 250 MN/m$^2$.

The porous SiC bearing materials can be used as seal rings in axial mechanical face seals in the pairing hard/soft against graphite or in the pairing hard/hard against themselves. They are likewise suitable for the production of shaft protection sleeves and components for sliding bearings whose wear resistance and reliability are to be improved.

Total porosities P given in the description and the examples of the invention were calculated from the measured values of the sintered density D, and the theoretical density $D_{th}$ in accordance with:

$$P = \left(1 - \frac{D_s}{D_{th}}\right) \cdot 100 \text{ [\% by volume]}$$

The pore composition, i.e., the percentages of the fiber pores, spherical pores and micropores, and also the pore size distribution of the macropores, were determined ceramographically by means of a semi-automatic image analysis using unetched micrographs of polished sections of the bearing elements.

FIG. 1 shows the trapezoidal area of the pore composition of the invention in the ternary pore system micropores (M), fiber-shaped macropores (F) and spherical macropores (S) (F-M-S), with the corner points in the system corresponding to the following limiting values of the pore composition:

| Points in the system | Pore Composition in volume percent | | |
|---|---|---|---|
| | % Micropores | % Fiber pores | % spherical pores |
| F | 0 | 100 | 0 |
| S | 0 | 0 | 100 |
| M | 100 | 0 | 0 |
| a | 10 | 80 | 10 |
| b | 10 | 10 | 80 |
| c | 40 | 10 | 50 |
| d | 40 | 50 | 10 |

Figure 2:
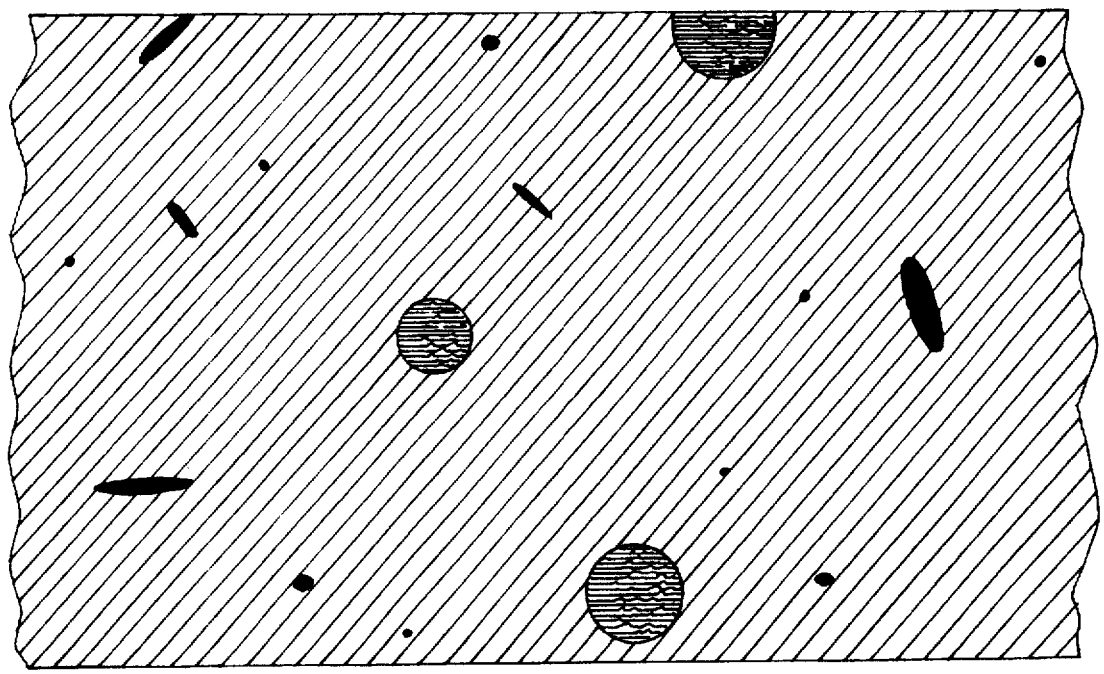
FIG. 2 is a schematic, cross-sectional view of the SiC material depicting the three-types of pores.

FIG. 2 shows the schematic cross section of the bearing material of the invention.

Figure 3:
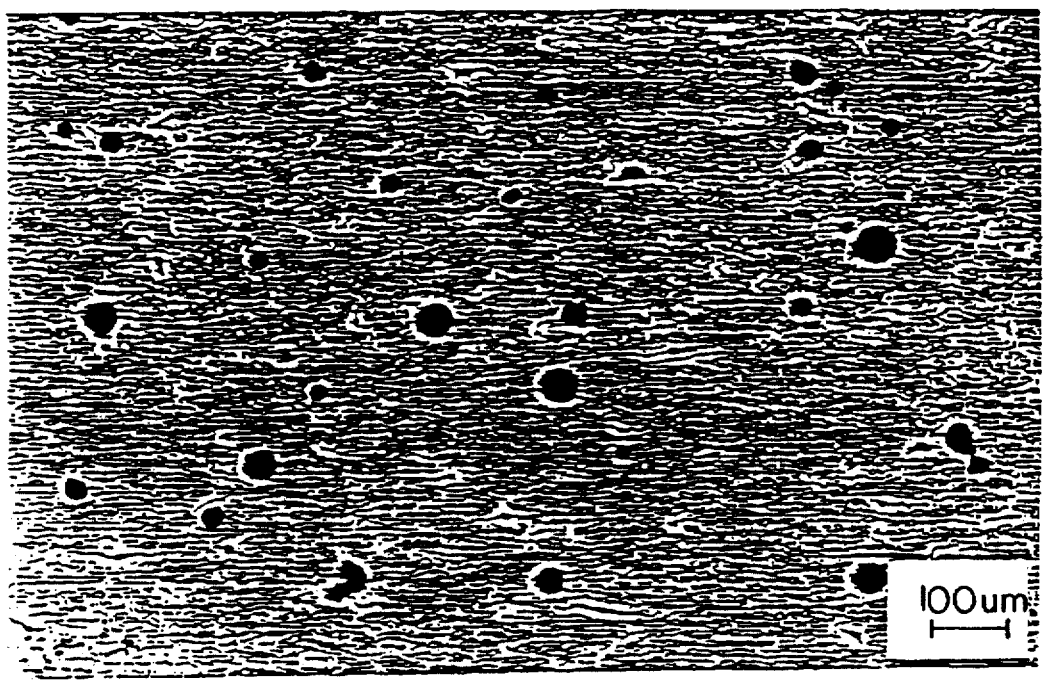
FIG. 3 is an optical micrograph of a polished section of a sintered sliding ring of α-SiC with additives forming fiber and spherical pores as well as macropores.

FIG. 3 shows the microstructure of a sintered body obtained by pressureless sintering of α-SiC with additives forming fiber and spherical pores and having a sintered density of 3.02 g/cm$^3$, a flexural strength of 310 MN/m$^2$, a total porosity of 5.3% by volume and the pore composition 38% fiber pores—42% spherical pores—20% micropores. The spherical macropores have a diameter of less than or equal to 60 µm. The fiber-shaped macropores have diameters of less than or equal to 20 µm and lengths of less than or equal to 70 µm. The diameter of the micropores is less than or equal to 5 µm.

The following examples illustrate the SiC bearing materials of the invention, their production and their advantages in tribological applications.

EXAMPLE 1

Production of a Seal Ring of the Invention

The starting material used was a fine α-SiC sinterable powder having a mean particle size of 0.6 µm and a specific surface area of 12 m$^2$ per gram. The residual oxygen content was 0.6% by weight. An aqueous slip having the following formulation was prepared:

| α-SiC sinterable powder | 98.0 parts by weight (pbw) |
| --- | --- |
| Carbon additive (carbon black) | 1.0 pbw |
| Aluminum additive (AlN) | 1.0 pbw |
| "Doped sinterable powder" | 100.0 pbw |
| Plastic spheres d = 50–70 μm (PMMA) | 1.0 pbw |
| Short cellulose fibers<br>d = 10–25 μm,<br>l = 30–80 μm | 1.0 pbw |
| Pressing aid (2.5 pbw sugar and 2.0 pbw Polyviol) | 4.5 pbw |

First there was prepared, with stirring, a 60% strength dispersion of the SiC powder in water in which the dopants and pressing aids had previously been dissolved or slurried. After homogenization of this dispersion was complete, the cellulose fibers and the plastic spheres were stirred in, a density of 1650 g/l was set by dilution and the finished slip thus prepared was dried by means of a spray dryer under standard conditions.

The free-flowing, pressable granular material obtained was finally processed by die pressing in an automatic dry press under a pressure of 100 MPa to give seal rings having a pressed density of 1.80 g/cm$^3$ and approximately dimensions $d_a$=88, $d_i$=66, h=28 mm. The pressed parts were thereupon preheated to 800° C. under a stream of protective argon gas in a carbonization furnace for 12 hours for the gentle removal of the lubricants and binders and also for the slow pyrolysis of the organic pore formers.

After cooling to room temperature, the debinderized seal rings were sintered in graphite crucibles which were placed in the heating zone of a graphite tube furnace for 30 minutes at 2050° C. and a rough vacuum of 20 mbar. The sintered bodies having a theoretical density of 3.19 g per cm$^3$ underwent an 18% linear shrinkage based on the diameter of the rings and had a sintered density of, on average, 3.02 g per cm$^3$, corresponding to a total porosity of 5.3% by volume.

The characterization of the pressed rings and of the sintered shaped bodies is summarized in Table 1. FIG. 3 shows an optical micrograph on a magnification of 1:100 of a polished section of a sintered seal ring. The three different types of pores can be clearly recognized as black areas or dots. Image analysis gave a fiber pore content of 38%, a spherical pore content of 42% and a micropore content of 20%. The SiC microstructure developed after plasma etching shows SiC crystallites having a mean size of 30 μm.

EXAMPLES 2–5

Production of Further Seal Rings of the Invention

SiC seal rings were produced in the same way as in Example 1, except that the total amount and the weight ratio to one another of the pore-forming additives cellulose and PMMA plastic spheres were varied (Examples 2 and 3), the PMMA additive producing spherical macropores was used exclusively as pore former (Example 4) or no macropore-forming additive was used at all (Example 5). In the latter case, i.e. without pore-forming additive, the dense SSiC standard material results. Examples 2–3 relate to the bearing material of the invention with the pore composition (proportions of fiber pores/spherical pores/micropores) and the total porosity being varied. Examples 4 and 5 are comparative examples with materials known from the prior art.

The characterization of the mixtures, the pressed green bodies and also the sintered shaped bodies are summarized in Table 1 together with the corresponding data of Example 1.

TABLE 1

Characterization of the mixtures, pressed bodies and sintered bodies

| | Example No. | | | | |
| --- | --- | --- | --- | --- | --- |
| | 1 | 2 | 3 | 4 | 5 |
| Addition of organic pore former (Parts by weight per 100 pbw of doped SiC) | 1,0 Fibers<br>1,0 spheres | 2,0 Fibers<br>1,0 spheres | 0,5 Fibers<br>1,5 spheres | no fibers<br>2,0 spheres | no fibers<br>no spheres |
| Pressed density (g/cm$^3$) | 1,80 | 1,81 | 1,79 | 1,75 | 1,82 |
| Springback of the pressed bodies (%) | 0,62 | 0,62 | 0,63 | 0,7 | 0,74 |
| Flexural strength of the pressed bodies (MN/mp$^2$) | 1,49 | 1,62 | 1,23 | 1,00 | 1,09 |
| Sintered density of the sintered bodies (g/cm$^3$) | 3,02 | 2,96 | 3,01 | 3,01 | 3,15 |
| Flexural strength* (MN/m$^2$) | 310 | 264 | 307 | 293 | 402 |
| Total porosity** (% by volume) | 5,3 | 7,2 | 5,6 | 5,6 | 1,3 |
| Pore composition | | | | | |
| % Fiber pores | 38 | 54 | 25 | — | — |
| % Spherical pores | 42 | 31 | 56 | 79 | — |
| % Micropores | 20 | 15 | 19 | 21 | 100 |
| Pore size distribution*** | | | | | |
| l/d fiber pores (μm) | ≦70/≦20 | ≦80/≦19 | ≦70/≦16 | — | — |
| d spherical pores (μm) | ≦60 | ≦56 | ≦58 | ≦60 | — |
| d micropores (μm) | ≦5 | ≦5 | ≦5 | ≦5 | ≦5 |

Three-point method (test bars 3 × 3 × 30 mm, loading span 25 mm),
based on a theoretical density of 3.19 g/cm$^3$
l = length, d = diameter

EXAMPLE 6

Results of the Seal Performance Bench Tests

To determine the tribological parameters (coefficient of friction and wear) in the pairings hard/soft and hard/hard, a number of test rings according to the invention were, after machining to the final dimensions required and surface lapping with loose B$_4$C grit 320, tested in comparison with test rings of competing materials. For this purpose, there was available a high pressure test bench (from Burgmann), by means of which the tribological parameters could be measured up to media pressures of 125 bar at a constant temperature of 60° C. and a circumferential speed of 9 m per second and using demineralized water as sealing medium. The results of the tribological bench tests are summarized in Tables 2 and 3.

0.02 μm per hour. Accordingly, in porous SiC, the trimodal pore composition 25% fiber pores—56% spherical pores—19% micropores can give a considerably improved tribological behavior in comparison with the bimodal pore composition 79% spherical pores—21% micropores. The worst performance for the hard/hard pairing was with the dense SiC containing 100% micropores from Example 5. In this case, there was increased wear as a result of material chipping and finally leakage, as typically occur as a result of adhesion caused by insufficient porosity.

The comparative test bench results show overall that in the SiC bearing material of the invention, there is available

TABLE 2

Tribological performance parameters of seal rings in the pairing hard/soft, SSiC ring against graphite ring* Burgmann - high-pressure test bench: test seal: H 74N/53, lubricant: deionized water, temperature 60° C., mean sliding speed: 9 m/s test duration per pressure stage: 48 h (except for 10 bar: 168 h)

| Pressure difference (bar) | SSiC ring Example 1 | | SSiC ring Example 4 | | SSiC ring Example 5 | |
|---|---|---|---|---|---|---|
| | Coefficient of friction | Wear (μm/h) ·←' | Coefficient of friction | Wear (μm/h) ·←' | Coefficient of friction | Wear (μm/h) ·←' |
| 10 | 0,135 | <0,020 | 0,140 | <0,020 | 0,164 | <0,020 |
| 25 | 0,083 | 0,021 | 0,089 | 0,031 | 0,108 | 0,055 |
| 50 | 0,065 | 0,025 | 0,070 | 0,075 | 0,077 | 0,102 |
| 75 | 0,055 | 0,040 | 0,061 | 0,083 | 0,065 | 0,133 |
| 100 | 0,040 | 0,050 | 0,049 | 0,089 | 0,058 | 0,150 |
| 125 | 0,035 | 0,062 | 0,040 | 0,092 | 0,055 | 0,165 |

*Graphite "Buko 1", from Burgmann

TABLE 3

Tribological performance parameters of seal rings in the pairing hard/hard, SSiC ring against SSiC ring of the same material. Burgmann - High-pressure test bench: test seal: H 74N/53 Medium: deionized water, temperature: 60° C., mean sliding speed: 9 m/s, test duration per process stage: 48 h

| Pressure difference (bar) | SSiC ring Example 3 | | SSiC ring Example 4 | | SSiC ring Example 5 | |
|---|---|---|---|---|---|---|
| | Coefficient of friction | Wear (μm/h) ·←' | Coefficient of friction | Wear (μm/h) ·←' | Coefficient of friction | Wear (μm/h) ·←' |
| 25 | 0,149 | <0,02 | 0,160 | 0,035 | 0,178 | 0,045** |
| 50 | 0,088 | <0,02 | 0,090 | 0,068 | — | *** |

**great amount of edge chipping
***test had to be terminated: great amount of adhesion wear, edge chipping, broken up sliding surface and leakage!

Tests in the hard/soft pairing (see Table 2) clearly show that porous SSiC rings (total porosity about 5% by volume) having a pore composition 80% macropores—20% micropores have, at all pressure stages, a lower coefficient of friction and also a lower wear than rings of dense SSiC (Example 5, standard SSiC, 100% micropores, total porosity 1.3% by volume). As shown by the tribological comparison of the rings of Examples 1 and 4, the change in the pore composition, i.e., the almost 50% substitution of the spherical macropores by fiber-shaped macropores, surprisingly, leads to a further reduction of wear at pressures of 25–125 bar by an average of 30%.

The seal ring tests of the hard/hard pairing (see Table 3), in which, in addition to rings of the invention from Example 3, rings of Examples 4 and 5 were used for comparison in the high-pressure region at 25 and 50 bar, also confirm the optimum suitability of the material of the invention having a trimodal pore composition. This hard/hard pairing is advisable, in particular, for sealing in abrasive and chemically aggressive media. The wear was in all cases less than a tribologically optimized material which allows sliding couples of SiC/graphite and SiC/SiC in floating-ring seals to be subjected to higher wear stresses than is possible for standard materials.

We claim:

1. A porous SiC sintered body having from 3 to 10% by volume of independent closed pores, where the SiC sintered body has a trimodal pore composition consisting of micropores (M), fiber-shaped macropores (F) and spherical macropores (S), whose amounts in the pore system F-M-S (FIG. 1) are fixed by the trapezoidal area having the corner points $a = 10\%M - 80\%F - 10\%S$ $b = 10\%M - 10\%F - 80\%S$ $c = 40\%M - 10\%F - 50\%S$ $d = 40\%M - 50\%F - 10\%S$ wherein the micropores have a diameter of less than or equal to 5 μm and the fiber-shaped macropores have a pore diameter in the range of 5 to 30 µm and a length of 10 to 80 µm and the spherical macropores have a diameter of 30 to 70 µm, and the flexural strength is at least 250 MN/m$^2$.

2. A mechanical face seal comprising a pair of seal rings wherein at least one of the seal rings comprises the porous SiC of claim 1.

3. A protective shaft sleeve and components for a sliding bearing wherein at least one of the shaft sleeve and the components comprise the SiC of claim 1.

4. A process for producing porous SiC sintered bodies as claimed in claim 1, which comprises forming a doped SiC powder by adding to α-SiC powder admixed with sintering additives and pressing aids, organic fibers having a size distribution of fiber diameter, of 8–30 µm and fiber length of 15–90 µm, and plastic spheres having a size distribution sphere diameter of 40–80 µm, in a weight ratio of fibers to spheres of from 9:1 to 1:9, the total of said fibers and spheres being present in an amount of from 1 to 3.5 parts by weight based on the doped SiC powder, pressing and shaping the homogenized powder mixture to give green bodies, preheating the green bodies in an inert atmosphere at temperatures up to 1000° C. and subsequently sintering the preheated green bodies at temperatures of from 2000° C. to 2100° C. to form sintered bodies having a density of from 90% to 97% of the theoretical density of the silicon carbide.

5. The process as claimed in claim 4, wherein the sintering additives are at least one member selected from the group consisting of aluminum nitride, boron and carbon in amounts of up to 2% by weight.

6. The process as claimed in claim 4, wherein the organic fibers used are cellulose having a size distribution of fiber diameter, of 8–30 µm and fiber length of 15–90 µm.

7. The process as claimed in claim 4, wherein the plastic spheres used are poly (methyl methacrylate) spheres (PMMA) having a size distribution sphere diameter (d$_s$) of 40–80 µm.

8. The process as claimed in claim 4, wherein the sintering of the preheated green bodies is carried out in an inert atmosphere at a pressure of <30 mbar.

9. The SiC sintered body as claimed in claim 1, wherein the SiC comprises α-silicon carbide in the form of prismatic, tabular crystallites having an average size <50 µm with up to 2% by total weight of elemental carbon, aluminum and boron.

* * * * *